(12) United States Patent
Wu et al.

(10) Patent No.: US 12,098,268 B2
(45) Date of Patent: Sep. 24, 2024

(54) ETHYLENE/PROPYLENE/NONCONJUGATED DIENE INTERPOLYMER COMPOSITION

(71) Applicant: Dow Global Technologies LLC, Midland, MI (US)

(72) Inventors: Xiaosong Wu, Lake Jackson, TX (US); Tao Han, Shanghai (CN); Colin Li Pi Shan, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 520 days.

(21) Appl. No.: 17/607,530

(22) PCT Filed: Apr. 30, 2019

(86) PCT No.: PCT/CN2019/085136
§ 371 (c)(1),
(2) Date: Oct. 29, 2021

(87) PCT Pub. No.: WO2020/220244
PCT Pub. Date: Nov. 5, 2020

(65) Prior Publication Data
US 2022/0213305 A1    Jul. 7, 2022

(51) Int. Cl.
*C08F 210/18*    (2006.01)
*C08L 23/16*    (2006.01)

(52) U.S. Cl.
CPC .................................... *C08L 23/16* (2013.01)

(58) Field of Classification Search
CPC ............................. C08L 23/16; C08F 210/18
See application file for complete search history.

(56) References Cited

U.S. PATENT DOCUMENTS

| | | | |
|---|---|---|---|
| 5,902,867 A | 5/1999 | Muskens et al. | |
| 5,919,988 A | 7/1999 | Pazos et al. | |
| 9,422,383 B2 | 8/2016 | LiPiShan et al. | |
| 10,160,819 B2 | 12/2018 | LiPiShan et al. | |
| 10,160,841 B2 | 12/2018 | LiPiShan et al. | |
| 10,370,524 B2 | 8/2019 | Wu et al. | |
| 10,450,394 B2 | 10/2019 | Fontaine et al. | |
| 11,098,144 B2 | 8/2021 | Tuberquia et al. | |
| 2004/0122190 A1 | 6/2004 | Cady et al. | |
| 2009/0299116 A1 | 12/2009 | Konze et al. | |
| 2009/0312509 A1 | 12/2009 | Stevens et al. | |
| 2010/0036069 A1 | 2/2010 | Konze et al. | |
| 2011/0313119 A1 | 12/2011 | Konze et al. | |
| 2012/0088894 A1 | 4/2012 | Konze et al. | |
| 2012/0101241 A1 | 4/2012 | Boone et al. | |
| 2012/0108770 A1 | 5/2012 | Aboelella et al. | |
| 2015/0259491 A1* | 9/2015 | LiPiShan | C08J 9/00 428/36.9 |
| 2015/0274867 A1* | 10/2015 | LiPiShan | C08L 23/16 428/36.9 |
| 2018/0105626 A1 | 4/2018 | Fontaine et al. | |
| 2019/0225724 A1 | 7/2019 | Tuberquia et al. | |
| 2019/0345318 A1 | 11/2019 | LiPiShan et al. | |
| 2020/0399456 A1 | 12/2020 | Wu et al. | |
| 2021/0230414 A1 | 7/2021 | LiPiShan et al. | |

FOREIGN PATENT DOCUMENTS

| | | | |
|---|---|---|---|
| JP | 2015-533913 A | 4/2017 | |
| JP | 2018-510244 A | 10/2021 | |
| WO | 2018/005852 A1 | 1/2018 | |
| WO | WO-2018119570 A1 * | 7/2018 | ............ C08F 210/18 |

OTHER PUBLICATIONS

PCT/CN2019/85136, English Translation of JP Office Action Dated May 30, 2023.

* cited by examiner

*Primary Examiner* — Robert C Boyle
(74) *Attorney, Agent, or Firm* — Boyle Fredrickson, SC

(57) ABSTRACT

The present disclosure provides a composition. In an embodiment, the composition includes a neat ethylene/propylene/nonconjugated polyene interpolymer. The neat ethylene/propylene/nonconjugated polyene interpolymer includes from greater than 0 wt % to 6.0 wt % nonconjugated polyene. The neat ethylene/propylene/nonconjugated polyene interpolymer has the following properties: (i) a molecular weight (Mw) from 240,000 to 270,000; (ii) a Mooney viscosity (ML (1+4), 125° C.) from 80 to 85; (iii) a rheology ratio (RR) from 35 to 65; (iv) a Mw/Mn from 2.2 to 3.5; (v) a tan delta ratio from 0.6 to 0.9; and (vi) an absolute tan delta slope from 5.0 to less than 10.0.

10 Claims, 1 Drawing Sheet

FIGs. 1A-1B
FIG. 1A
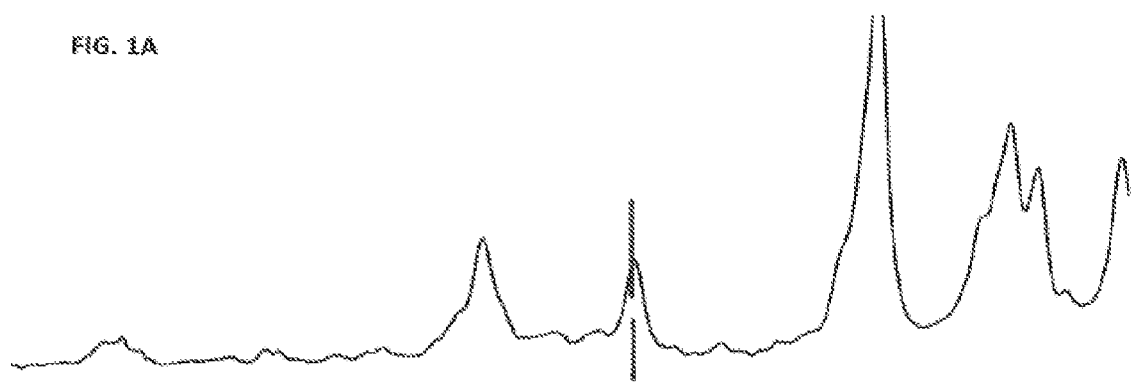
FIG. 1B
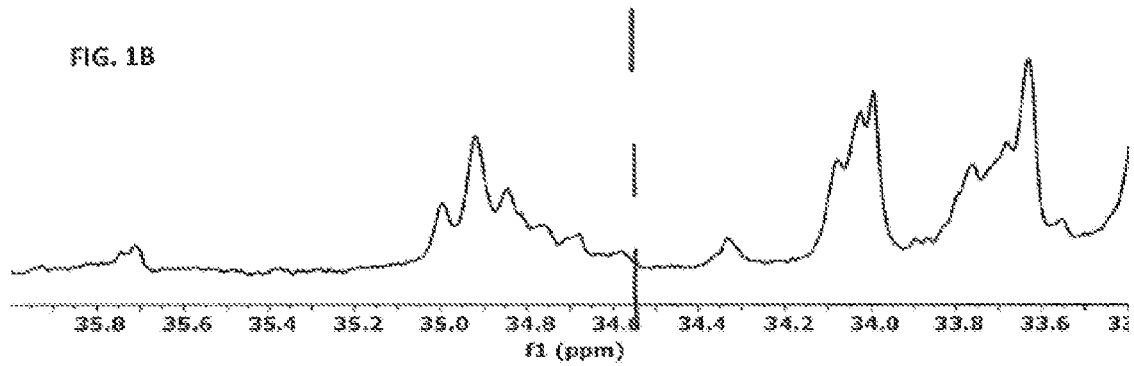

ETHYLENE/PROPYLENE/NONCONJUGATED DIENE INTERPOLYMER COMPOSITION

BACKGROUND

Ethylene-propylene-nonconjugated polyene terpolymer (also known as "EPDM") is widely used in many automotive and industrial applications. For example, EPDM is used for automotive and industrial hose products because of EPDM's thermal stability and oxidative stability, and EPDM's chemical resistance to polar organic fluids and aqueous inorganic fluids. In automotive applications, higher "under-hood" temperatures (as a result of lower hood lines), reduced air flow within the engine area, and turbo chargers have driven the need for materials having greater heat-resistance for items such as coolant hoses, emission hoses, brake hoses and air ducts. Conventional EPDM automotive hoses, however, are still limited, because of poor long term heat aging performance.

It is known that heat aging performance improves as chain branching within the EPDM increases. However, as chain branching increases processability of the EPDM decreases. The art recognizes the on-going need for EPDM compositions having a balance of chain branching and processability.

SUMMARY

The present disclosure provides an EPDM with higher molecular weight for better filler uptake and improved processability. The disclosure is directed to EPDM compositions which have increased molecular weight and improved processability as indicated by an increase in rheology ratio. The present EPDM composition is made by polymerization with two or more catalysts having different reactivities, in two or more separate reactors, with the resultant interpolymers intimately combined.

The present disclosure provides a composition. In an embodiment, the composition includes a neat ethylene/propylene/nonconjugated polyene interpolymer. The neat ethylene/propylene/nonconjugated polyene interpolymer includes from greater than 0 wt % to 6.0 wt % nonconjugated polyene. The neat ethylene/propylene/nonconjugated polyene interpolymer has the following properties:
  (i) a molecular weight (Mw) from 240,000 to 270,000;
  (ii) a Mooney viscosity (ML (1+4), 125° C.) from 80 to 85;
  (iii) a rheology ratio (RR) from 35 to 65;
  (iv) a Mw/Mn from 2.2 to 3.5;
  (v) a tan delta ratio from 0.6 to 0.9; and
  (vi) an absolute tan delta slope from 5.0 to less than 10.0.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percentages are based on weight and all test methods are current as of the filing date of this disclosure.

The terms "blend" or "polymer blend," as used herein, is a blend of two or more polymers. Such a blend may or may not be miscible (phase separated). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer containing, in polymerized form, a majority weight percent of units derived from ethylene based on the total weight of the polymer. Nonlimiting examples of ethylene-based polymers include low density polyethylene (LDPE), linear low density polyethylene (LLDPE), very low density polyethylene (VLDPE), ultra low density polyethylene (ULDPE), medium density polyethylene (MDPE), high density polyethylene (HDPE), and functionalized polyethylene, e.g., ethylene vinyl acetate (EVA), ethylene ethyl acrylate (EEA), and the like.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

An "olefin-based polymer" or "polyolefin" is a polymer that contains more than 50 weight percent polymerized olefin monomer (based on total amount of polymerizable monomers), and optionally, may contain at least one comonomer. Nonlimiting examples of an olefin-based polymer include ethylene-based polymer or propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer"

and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

TEST METHODS

Absolute tan delta slope. Absolute value of tan delta slope is defined by Equation (A) below.

$$m = \left| \frac{[tandelta@0.1\text{rad}/s - tandelta@100\text{rad}/s] * 1000}{0.1\text{rad}/s - 100\text{rad}/s} \right|,$$

$^{13}$C NMR Method for EPDM Composition Analysis. The samples were prepared by adding approximately "2.6 g" of a "50/50 mixture of tetrachloroethane-d2/orthodichlorobenzene" that is "0.025M" in chromium acetylacetonate (relaxation agent) to "0.2 g sample" in a 10 mm NMR tube. The samples were dissolved, and homogenized, by heating the tube and its contents to 150° C. The data were collected using a Bruker 400 MHz spectrometer, equipped with a Bruker Dual DUL high-temperature CryoProbe. The data was acquired using "160 scans per data file," a six second pulse repetition delay, with a sample temperature of 120° C. The acquisition was carried out using a spectral width of 25,000 Hz and a file size of 32K data points.

NMR spectral analysis of the composition of the examples was carried out using the following analysis method. Quantitation of monomers present in EPDM can be calculated using the following equations (1 through 9).

The calculation of moles ethylene normalizes the spectral range from 55.0-5.0 ppm to 1000 integral units. The contribution under the normalized integral area only accounts for 7 of the ENB carbons. The ENB diene peaks at 111 and 147 ppm are excluded from the calculation due to concerns that double bonds may react at high temperature.

$$molesEth = \frac{(1000 - 3 * molesP - 7 * molesENB)}{2} \quad \text{Equation 1}$$

$$molesENB = CH3(13.6-14.7ppm) \quad \text{Equation 2}$$

$$molesP = CH3(19.5-22.0ppm) \quad \text{Equation 3}$$

$$mole\%ethylene = \frac{100 * molesE}{molesE + molesP + molesENB} \quad \text{Equation 4}$$

$$moles\%propylene = \frac{100 * molesP}{molesE + molesP + molesENB} \quad \text{Equation 5}$$

$$moles\%ENB = \frac{100 * molesENB}{molesE + molesP + molesENB} \quad \text{Equation 6}$$

$$Wt\%ethyene = \quad \text{Equation 7}$$
$$\frac{100 * moles\%E * 28}{mole\%E * 28 + mole\%P * 42 + mole\%ENB * 120}$$

-continued $$Wt\%propylene = \quad \text{Equation 8}$$
$$\frac{100 * moles\%P * 42}{mole\%E * 28 + mole\%P * 42 + mole\%ENB * 120}$$

$$Wt\%ENB = \frac{100 * moles\%ENB * 120}{mole\%E * 28 + mole\%P * 42 + mole\%ENB * 120} \quad \text{Equation 9}$$

Intermediate Chain Branching % Area $^{13}$C NMR. "Intermediate chain branching" (or "iCB") is the phenomenon wherein oligomers produced in situ are rapidly incorporated into the polymer backbone. The branches resulting from incorporation of these oligomers do not increase the viscosity at low shear rates and therefore the resultant polymer exhibit similar behavior to that of linear molecules. Incorporation of the oligomers is highly efficient such that oligomer content is undetectable in the final polymer. It is believed that iCB polymer exhibits a combination of high density of branches (estimated by NMR) and their intermediate length (30 to 75 carbon units) extend the backbone chain length required for entanglement in the molten state. This behavior is virtually similar to that of linear molecules.

$^{13}$C NMR spectral analysis of the EPDMs to quantitate the level of intermediate chain branching was performed using tetrachloroethane-d2 with 0.025 M chromium acetylacetonate, to improve the spectral resolution in the 34.6-34.4 ppm region. The samples were prepared by adding approximately "2.6 g" of a "tetrachloroethane-d2 with 0.025 M chromium acetylacetonate" to "0.3 g sample" in a 10 mm NMR tube. The samples were dissolved, and homogenized, by heating the tube and its contents to 140° C. The data were collected using a Bruker 400 MHz spectrometer with inverse gated NMR puke, equipped with a Bruker Dual DUL high-temperature CryoProbe. The data was acquired using "8000 scans per data file," a 7.3 second pulse repetition delay, with a sample temperature of 120° C. Spectral data were referenced to the EEE backbone at 30 ppm.

EPDM polymer with iCB exhibits a methylene peak in the region from 34.4 ppm to 34.6 ppm which is greater than 0.01% of the total integral area from 160.0 to 100.0 ppm plus 60.0 to 0.000 ppm (whole spectra excluding tetrachloroethane solvent) as disclosed in WO2018/005922. $^{13}$C NMR spectral analysis of the inventive EPDM displayed no methylene peak in the region from 34.4 ppm to 34.6 ppm. The inventive EPDM interpolymer of the present disclosure is void of intermediate chain branching.

Density is measured in accordance with ASTM D792, Method B. The result is recorded in grams per cubic centimeter (g/cc).

Differential Scanning calorimetry (DSC). Differential Scanning calorimetry (DSC) is used to measure crystallinity in ethylene-based (PE) samples (including EPDM) and propylene-based (PP) samples. Sample (0.5 g) sample was compression molded into a film, at 5000 psi, 190° C., for two minutes. About 5 to 8 mg of film sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −90° C. for PE (−90° C. for PP), and kept isothermally at that temperature for three minutes. The sample is next heated at a rate of 10° C./min, until complete melting (second heat). The percent crystallinity is calculated by dividing the heat of fusion (H$_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve, and the crystallization temperature ($T_c$) is determined from the first cooling curve.

Dynamic Mechanical Spectroscopy (DMS). Small angle oscillatory shear (melt DMS) was performed using a TA instruments ARES, equipped with "25 mm parallel plates," under a nitrogen purge. The time between sample loading, and the beginning of the test, was set to five minutes for all samples. The experiments were performed at 190° C., over a frequency range of 0.1 rad/s to 100 rad/s. The strain amplitude was adjusted, based upon the response of the samples from 1 to 3%. The stress response was analyzed in terms of amplitude and phase, from which, the storage modulus (G'), loss modulus (G"), dynamic viscosity η*, and tan delta were calculated. Specimens for Dynamic Mechanical Spectroscopy were "25 mm diameter×3.3 mm thick" compression molded discs, formed at 180° C., and 10 MPa molding pressure, for five minutes, and then quenched between chilled platens (15-20° C.) for two minutes. The rheology ratio (V0.1/V100 at 190° C.; also referred to as "RR"), tan delta (0.1 rad/s, 190° C.) and tan delta (100 rad/s, 190° C.) were recorded.

FTIR Method for EPDM Composition Analysis. The terpolymers containing ethylene, propylene, and 5-ethylidene-2-norbornene were analyzed using ASTM D9300 for its ethylene content, and ASTM D6047 for its ethylidenenorbornene or dicyclopentadiene content.

Gel Permeation Chromatography. The chromatographic system consisted of either a Polymer Laboratories Model PL-210 or a Polymer Laboratories Model PL-220. The column and carousel compartments were operated at 140° C. The columns were three Polymer Laboratories, 10-micron Mixed-B columns. The solvent used was 1,2,4 trichlorobenzene. The samples were prepared at a concentration of "0.1 gram of polymer in 50 milliliters of solvent." The solvent used to prepare the samples contained "200 ppm of butylated hydroxytoluene (BHT)." Samples were prepared by agitating lightly for two hours at 160° C. The injection volume was 100 microliters, and the flow rate was 1.0 milliliters/minute.

Calibration of the GPC column set was performed with 21 "narrow molecular weight distribution polystyrene standards," with molecular weights ranging from 580 to 8,400,000 g/mole, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing "highest molecular weight" component to minimize degradation. The polystyrene standard peak molecular weights were converted to polyethylene molecular weights using the following equation: $M_{polyethylene} = A \times (M_{polystyrene})^B$, where M is the molecular weight, A has a value of 0.431 and B is equal to 1.0 (as described in Williams and Ward, *J. Polym. Sc., Polym. Let.*, 5, 621 (1968)). Polyethylene equivalent molecular weight calculations were performed using Viscotek TriSEC software Version 3.0.

Mooney Viscosity. Mooney Viscosity (ML1+4 at 125° C.) was measured in accordance with ASTM D1646, with a one minute preheat time and a four minute rotor operation time. The instrument is an Alpha Technologies Mooney Viscometer 2000. The viscosity of each formulated compositions was measured using an uncured blanket (see experimental section), so that the viscosity of the uncured composition could be examined. Samples were conditioned for 24 hours at room temperature, prior to testing.

Tan delta ratio. Tan delta ratio is defined tan delta (0.1 rad/s, 190° C.) for the first polymer component produced in the first reactor/tan delta (0.1 rad/s, 190° C.) of the final composition in the second reactor.

BRIEF DESCRIPTION OF THE DRAWING

FIGS. 1A and 1B are $^{13}$C NMR spectra showing the presence of a peak at 34.4 ppm to 34.6 ppm for a prior art EPDM of comparative sample 3 (CS3) (FIG. 1A) compared to an $^{13}$C NMR spectrum showing no peak at 34.4 ppm to 34.6 ppm for the EPDM of inventive Example 1 (FIG. 1B) in accordance with an embodiment of the present disclosure.

DETAILED DESCRIPTION

The present disclosure provides a composition. In an embodiment, the composition includes a neat ethylene/propylene/nonconjugated polyene interpolymer. The neat ethylene/propylene/nonconjugated polyene interpolymer includes from greater than 0 wt % to 6.0 wt % nonconjugated polyene. The neat ethylene/propylene/nonconjugated polyene interpolymer has the following properties:
 (i) a molecular weight (Mw) from 240,000 to 270,000;
 (ii) a Mooney viscosity (ML (1+4), 125° C.) from 80 to 85;
 (iii) a rheology ratio (RR) from 35 to 65;
 (iv) a Mw/Mn from 2.2 to 3.5;
 (v) a tan delta ratio from 0.6 to 0.9; and
 (vi) an absolute tan delta slope from 5.0 to less than 10.0.

The ethylene/propylene/nonconjugated polyene interpolymer is neat. A "neat" ethylene/propylene/nonconjugated polyene interpolymer contains no added oil, otherwise is void of oil, or otherwise is "oil-free." It is therefore understood that the Mooney viscosity value and the rheology ratio value are for the neat ethylene/propylene/nonconjugated polyene interpolymer that is void of oil.

The neat ethylene/propylene/nonconjugated polyene interpolymer includes ethylene monomer, propylene comonomer, and nonconjugated polyene terpolymer. Although propylene is the copolymer, it is understood that other α-olefins may be used as the comonomer. Nonlimiting examples of suitable comonomers other than propylene include $C_4$-$C_8$ α-olefins such as 1-butene, 1-hexene, and 1-octene.

The nonconjugated polyene is a $C_6$-$C_{15}$ straight chain, branched chain, or cyclic hydrocarbon diene. Nonlimiting examples of suitable straight chain acyclic dienes include 1,4-hexadiene 1,5-heptadiene. Nonlimiting examples of suitable branched chain acyclic dienes include 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene. Nonlimiting examples of suitable single ring alicyclic dienes include as 1,4-cyclohexadiene, 1,5-cyclooctadiene and 1,5-cyclododecadiene. Nonlimiting examples of multi-ring alicyclic fused and bridged ring dienes include tetrahydroindene, methyl tetrahydroindene, alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene.

In an embodiment, the diene is selected from ENB, dicyclopentadiene, 1,4-hexadiene, 7-methyl-1,6-octadiene, dicyclopentadiene and 1,4-hexadiene.

In an embodiment, the diene is 5-ethylidene-2-norbornene (ENB).

In an embodiment, the neat ethylene/propylene/nonconjugated polyene interpolymer includes from 45 wt % to 55 wt %, or from 47 wt % to 53 wt %, or from 49 wt % to 51 wt % ethylene monomer, from 40 wt % to 50 wt %, or from 43 wt % to 49 wt %, or from 45 wt % to 47 wt % propylene comonomer, (iii) from 1 wt % to 6 wt %, or 2 wt % to 5 wt %, or 3 wt % to 4 wt %, or from 4 wt % to 5 wt % ENB; the ethylene/propylene/nonconjugated polyene interpolymer having the following properties:
- (i) a molecular weight (Mw) from 240,000 to 260,000, or from 245,000 to 258,000, or from 248,000 to 256,000;
- (ii) a Mooney viscosity from 80 to 85, or from 82 to 84;
- (iii) a rheology ratio from 35 to 45, or from 37 to 43, or from 39 to 41;
- (iv) a Mw/Mn from 2.2 to 3.5;
- (v) a tan delta ratio from 0.6 to 0.9;
- (vi) an absolute tan delta slope from 5.0 to less than 10.0; and
- (vii) is void of an $^{13}$C NMR peak from 34.4 ppm to 34.6 ppm.

Weight percent is based on total weight of the neat ethylene/propylene/nonconjugated polyene interpolymer. The neat ethylene/propylene/nonconjugated polyene interpolymer with the foregoing amounts of ethylene, propylene, and ENB and properties (i)-(vii) is hereafter referred as composition1.

In an embodiment, composition1 includes from 47 wt % to 53 wt %, or from 49 wt % to 51 wt % ethylene monomer, from 43 wt % to 49 wt %, or from 45 wt % to 47 wt % propylene comonomer, (iii) from 2 wt % to 5 wt %, or 3 wt % to 4 wt %, or from 4 wt % to 5 wt % ENB; the ethylene/propylene/nonconjugated polyene interpolymer having the following properties:
- (i) a Mw from 240,000 to 260,000, or from 245,000 to 258,000, or from 248,000 to 256,000;
- (ii) a Mooney viscosity from 80 to 105, or from 82 to 100, or from 85 to 95;
- (iii) a rheology ratio from 35 to 65, or from 37 to 60, or from 39 to 55;
- (iv) a Mw/Mn from 3.0 to 3.5;
- (v) a tan delta ratio from 0.65 to 0.9; or from 0.7 to 0.85;
- (vi) an absolute tan delta slope from 6.0 to less than 12.0, or from 7.0 to less than 11.0;
- (vii) is void of an $^{13}$C NMR peak from 34.4 ppm to 34.6 ppm; and
- (viii) has a Mw/V0.1 ratio less than 1.8, or from 1.5 to 1.7.

Composition 1 is a high Mooney EPDM exhibits a balance of improved physical properties from high molecular weight linear polymer and improved processability from lower molecular weight highly branched polymer, with absence of intermediate branching.

In an embodiment, the present neat ethylene/propylene/nonconjugated polyene interpolymers are produced in two polymerization reactors that are configured and operated in series, i.e. the output of one reactor is fed to the second reactor. The reactors can be the same or different. In an embodiment, each reactor is the same and each reactor is a loop reactor.

The reactors can be operated in like or different modes. In an embodiment, the first reactor is operated in such a manner that the formation of the high molecular weight fraction of the desired polymer is promoted while the second reactor (i.e., the reactor that receives as a feed the output from the first reactor) is operated in such a manner that the formation of the low molecular weight fraction of the desired polymer is promoted.

The temperature difference between first reactor and second reactor influences the Mw/Mn of the final product, the greater the temperature difference, the broader the Mw/Mn. While the operating temperature of each reactor will depend upon a host of factors, e.g., the α-olefin(s), the diene, the catalyst, the solvent, equipment and equipment design, pressure, flow rate and turbulence, the relative amounts of the reagents, desired product properties, and the like, a typical operating temperature for the first reactor is from 65° C. to 90° C. and a typical operating temperature for the second reactor is from 85° C. to 120° C. The residence time of the reactants in the individual reactors will also depend upon these factors, but a typical residence time for the reactants in each reactor is from two minutes to 90 minutes.

Ethylene, α-olefin (i.e., propylene), and diene (if any), solvent and, optionally, hydrogen are blended by any convenient means in desired proportion, and then the blend is introduced into the first reactor, i.e., the reactor whose output is used as a feed for the other or second reactor. A first catalyst is typically introduced into the first reactor apart from the other reagents. The first reactor and the second reactor are operated on a continuous basis such that as output from the first reactor is withdrawn as feed for the second reactor, additional reagents are added to the first reactor to maintain the reaction mass in a steady-state, i.e. a relatively constant and proportional concentration of ethylene, α-olefin, diene (if any), solvent, catalyst and molecular weight regulator (if any).

The first reactor and second reactor are in fluid communication with one another, typically connected by one or more conduits. These conduits are typically equipped with one or more mixers (to promote a homogeneous blending of the reaction mass).

As with the first reactor, ethylene, α-olefin, diene (if any), solvent and, optionally, hydrogen are blended in desired proportion, and then the blend is introduced into the second reactor, i.e., the reactor that receives as a feed the output from the other or first reactor. Likewise, a second catalyst (a different catalyst from the first catalyst introduced into the first reactor) is typically introduced into the second reactor apart from the other reagents. The output from the first reactor typically contains from 1 weight percent to 30 weight percent solids (i.e., polymer), and it either can be fed to the second reactor apart from the other reagents, or it can first be blended with one or more of the other reagents prior to its introduction into the second reactor. The output from the second reactor typically contains between from 8 weight percent to 30 weight percent solids, in which the desired polymer product is separated from the solvent and unreacted monomers, and the latter (i.e., solvent and unreacted monomers) are individually either recycled or disposed in a safe and environmentally acceptable manner.

In an embodiment, the neat ethylene/propylene/nonconjugated polyene interpolymer is an in-reactor blend of a first polymer component and a second polymer component. The first polymer component is produced in the first reactor and the second polymer component is produced in the second reactor. The first polymer component has a Mw from 375,000, or 380,000 to 390,000, or 400,000. In a further embodiment, the first polymer component has a Mw from 375,000 to 400,000, or from 380,000 to 390,000.

In an embodiment, a first catalyst is introduced in the first reactor and a second catalyst is introduced into the second reactor. The second catalyst is different than the first catalyst. The first catalyst (introduced into the first reactor) is a zirconium-based catalyst and the second catalyst (introduced into the second reactor) is a hafnium-based catalyst and the present neat ethylene/propylene/nonconjugated polyene interpolymer contains a residual amount of hafnium and a residual amount of zirconium. The term "residual amount," as used herein is from greater than 0 ppm to 5 ppm.

In an embodiment, the first catalyst is [[rel-2'-2'''-[[(1R, 3S)-1,3-Methyl-1,3-propanediyl]bis(oxy-kO)]bis[3-[3,6-bis (1,1-dimethylethyl)-9H- carbazol-9-yl]5'-fluoro-5-(1,1,3,3-tetramethylbutyl)[1,1'-biphenyl]-2-olato-kO]](2-)] dimethylzirconium and is hereafter referred to as catalyst A. Catalyst A has the structure (A) as provided below.

Structure (A)

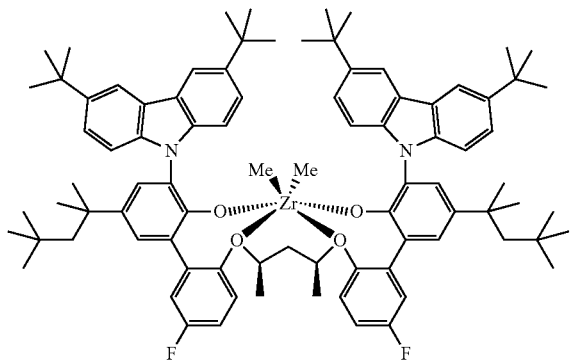

Chemical Formula: $C_{87}H_{108}F_2N_2O_4Zr$
Molecular Weight: 1375.02

In an embodiment, the second catalyst is [[[2',2'''-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1, 1'-biphenyl]-2-olato-kO]](2-)]-hafniumdimethyl or OC-6-33)-Dimethyl[[2',2'''-[1,3-propanediylbis(oxy-kO)]bis[3-[3, 6-bis(1,1-dimethylethyl)-9H-carbazol-9-yl]-5'-fluoro-5-(1, 1,3,3-tetramethylbutyl)[1,1'-biphenyl]-2-olato-kO]](2-)] hafnium and is hereafter referred to as catalyst B. Catalyst B has the structure (B) provided below.

Structure (B)

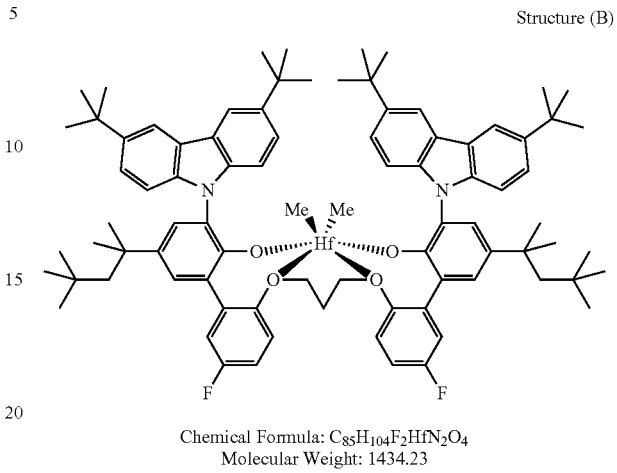

Chemical Formula: $C_{85}H_{104}F_2HfN_2O_4$
Molecular Weight: 1434.23

In an embodiment, composition 1 contains from 1 ppm to 5 ppm residual zirconium and from 1 ppm to 5 ppm residual hafnium. In a further embodiment, the residual amount for each of the hafnium metal and zirconium metal is to the exclusion of titanium.

2. Additive

The present neat ethylene/propylene/nonconjugated polyene interpolymer may include optional other additives. Nonlimiting examples of suitable additives include, oil, fillers, antioxidants, UV stabilizers, foaming agents, flame retardants, colorants or pigments, and combinations thereof.

In an embodiment, oil is added to the neat ethylene/propylene/nonconjugated polyene interpolymer such that the ethylene/propylene/nonconjugated polyene interpolymer in no longer void of oil.

In an embodiment, the neat ethylene/propylene/nonconjugated polyene interpolymer composition comprises at least one additive selected from fillers, antioxidants, UV stabilizers, foaming agents, or combinations thereof. Fillers include, but are not limited to, carbon black; silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; phenol-formaldehyde, polystyrene, and poly(a-methyl)-styrene resins, natural fibers, synthetic fibers, and the like. In an embodiment, the filler is carbon black.

In an embodiment, the neat ethylene/propylene/nonconjugated polyene interpolymer includes an antioxidant. Nonlimiting examples of suitable antioxidant include, hindered phenols, bisphenols, and thiobisphenols; substituted hydroquinones; tris(alkylphenyl)phosphites; dialkylthiodipropionates; phenylnaphthylamines; substituted diphenylamines; dialkyl, alkyl aryl, and diaryl substituted p-phenylene diamines; monomeric and polymeric dihydroquinolines; 2-(4-hydroxy-3,5-t-butylaniline)-4,6-bis(octylthio)1,3,5-triazine, hexahydro-1,3,5-tris-(3,5-di-t-butyl-4-hydroxyphenyl)propionyl-s-triazine, 2,4,6-tris(n-1-4-dimethylpentylphenylene-diamino)-1,3,5-triazine,tris-(3,5-di-t-butyl-4-hydroxybenzyl)isocyanurate, nickel dibutyldithiocarbamate, 2-mercaptotolylimidazole and its zinc salt, petroleum waxes, and the like.

3. Applications

The present neat ethylene/propylene/nonconjugated polyene interpolymer composition can be further compounded into a rubber formulation (Banbury mixer or extruder) and further cured into a final article (extrusion, injection molding, calendaring).

The neat ethylene/propylene/nonconjugated polyene interpolymer and/or final article may be used in automotive hoses, automotive belts, weatherstrip profiles, architectural profiles, roofing membranes, injection molded articles, general purpose rubber goods, tires, impact modification, TPE compounds, and other traditional and nontraditional rubber elastomer uses.

By way of example, and not limitation, some embodiments of the present disclosure will now be described in detail in the following Examples.

EXAMPLES

1. Synthesis of Experimental EPDM

Continuous Polymerization

The polymerization reaction was performed under steady state conditions, that is, constant reactant concentration and continual input of solvent, monomers, and catalyst, and constant withdrawal of unreacted monomers, solvent and polymer. The reactor system was cooled and pressurized to prevent formation of a vapor phase. Monomers: ethylene (CAS 74-85-1); propylene (CAS 115-07-1); 5-ethylidene-2-norbornene, ENB (CAS 16219-75-3).

The polymer composition was produced in a solution polymerization process using two reactors, (i) a continuous stir-tanked reactor ("first reactor") followed by (ii) a loop reactor ("second reactor"). Ethylene was introduced in a mixture of a solvent of ISOPAR E (available from Exxon-Mobil), propylene was introduced and 5-ethylidene-2-norbornene (ENB) was introduced, each forming a reactor feed stream.

Catalyst A was fed to the first reactor and catalyst B was fed to the second reactor separately; catalyst A and catalyst B were activated in-situ using co-catalyst 1 and co-catalyst 2.

Cocatalyst-1 is a mixture of methyldi(C14-18 alkyl)ammonium salts of tetrakis(pentafluorophenyl)borate, prepared by reaction of a long chain trialkylamine (ARMEEN M2HT, available from Akzo-Nobel, inc.), HCl and Li[B(C6F5)4], substantially as disclosed in U.S. Pat. No. 5,919,988 (Ex. 2). Cocatalyst-1 is from Boulder Scientific, and used without further purification.

Cocatalyst-2 is modified methylalumoxane (MMAO), from Akzo Nobel, and used without further purification The structures for catalyst A and catalyst B are provided below.

Catalyst A: [[rel-2',2'''-[[(1R,3S)-1,3-Methyl-1,3-propanediyl]bis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2-)dimethylzirconium. CAS #1360629-63-5.

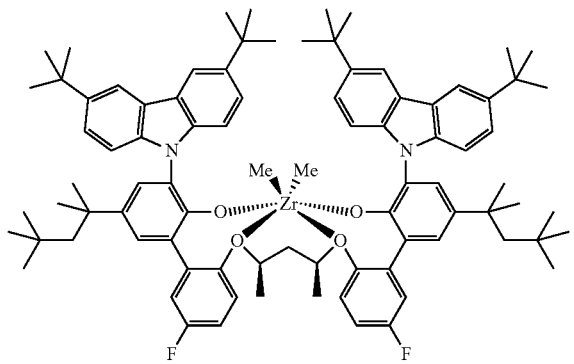

Chemical Formula: $C_{87}H_{108}F_2N_2O_4Zr$
Molecular Weight: 1375.02

Catalyst B: [[[2',2'''-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2-)]-hafniumdimethyl or OC-6-33)-Dimethyl[[2',2'''-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2-)]hafnium. CAS #1360650-53-8.

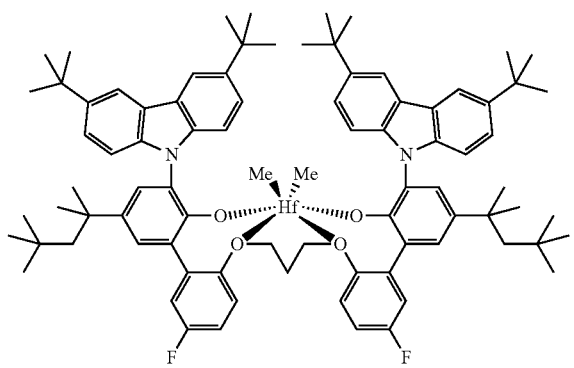

Chemical Formula: $C_{85}H_{104}F_2HfN_2O_4$
Molecular Weight: 1434.23

The outlet of each reactor was consequently a mixture of polymer, solvent, and reduced levels of the initial monomers. The outlet of the first reactor was fed directly into the second reactor (unless otherwise sampled). The molecular weight of the polymer was controlled by adjusting each reactor's temperature, monomer conversion and/or the addition of a chain terminating agent such as hydrogen.

After polymerization, a small amount of water was introduced into the reactor exit stream as a catalyst kill, and the reactor exit stream was introduced into a flash vessel, in which the solids concentration was increased by at least 100 percent. A portion of the unreacted monomers, that is, ENB, ethylene, and propylene, and the unused diluent were then collected, and recycled back to the reactor feeds as appropriate.

Monomer feed rate and polymerization temperature and other conditions are listed in below in 1 and Table 2.

TABLE 1

Reaction Conditions for Inventive EPDM

| EXAMPLE | REACTOR TEMP. [DEG C.] | PRESSURE [PSIG] | SOLVENT/ ETHYLENE FEED RATIO [LB/LB] | PROPYLENE/ ETHYLENE FEED RATIO [LB/LB] | ENB/ ETHYLENE FEED RATIO [LB/LB] |
|---|---|---|---|---|---|
| EPDM01-R1 (first reactor) | 120.36 | 731.36 | 13.21 | 2.38 | 0.31 |
| EPDM01 (second reactor) | 121.98 | 725.01 | 6.36 | 0.44 | 0.10 |

TABLE 2

Reaction Conditions for Inventive EPDM

| Example | $H^2$ Mol % | $C^2$ Concen. [g/L] | Catalyst Efficiency [lb_poly/ lb_metal] *10E6 | Borate/ Cat. Metal Ratio [mol/mol] | Aluminum/ Cat. Metal Ratio [mol/mol] |
|---|---|---|---|---|---|
| EPDM01 (first reactor) | 0.01 | 21.11 | 2.82 | 2.02 | 4.95 |
| EPDM01 (second reactor) | 0.76 | 10.44 | 1.05 | 2.00 | 10.01 | percent is based on total weight of the final EPDM terpolymer.

As shown in FIG. 1B, IE1 has no iCB (no $^{13}$C NMR peak at 34.4 ppm to 34.6 ppm) whereas CS3 has iCB as evident by the $^{13}$C NMR peak at 34.4 ppm to 34.6 ppm in FIG. 1A.

IE1 has a Mw/Mn from 3.0 to 3.5 (3.4) absolute tan delta slope of 9.5, and has a tan delta ratio from 0.6 to 0.9 (0.84), and no iCB. The combination of these properties demonstrate that IE1 has a balance of processability and branching (no iCB). The tan delta ratio of 0.6-0.9 indicates that the tan delta of the final EPDM terpolymer is lower than the tan delta value of the EPDM terpolymer in the first reactor. The

TABLE 3

Property Data for Comparative and inventive EPDM

| | CS1 R2 (final) | CS2 R1 | R2 (final) | IE1 R1 | R2 (final) | CS3[#] R2 (final) | CS4[$] R2 (final) | CS5[%] R2 (final) |
|---|---|---|---|---|---|---|---|---|
| % C2 | 51 | 48.9 | 49 | | 49.1 | 69.4 | 70.5 | 70 |
| % C3 | 44.1 | 46.7 | | | 45.9 | | | |
| % ENB | 4.9 | 4.4 | 4.9 | | 5 | 5.1 | 4.3 | 4.9 |
| Wt % 1$^{st}$ component* | | 35 | 65 | 35 | 65 | | | |
| Mooney | 69 | | 87 | | 84 | 70.3 | 70 | 70 |
| Mn (g/mol) | 80263 | | 94237 | 180465 | 75902 | 68551 | 63907 | 60648 |
| Mw (g/mol) | 195874 | 369661 | 253846 | 388820 | 255266 | 167265 | 264574 | 163750 |
| Mz (g/mol) | 392920 | 688393 | 597609 | 733113 | 645361 | 337137 | 863056 | 366099 |
| Mw/Mn | 2.44 | 2.09 | 2.7 | 2.15 | 3.4 | 2.44 | 4.14 | 2.7 |
| V0.1, 190° C. (Pa-s) | 86192 | 452095 | 114000 | 569679 | 153502 | 49392 | 116420 | 107012 |
| V100, 190° C.) (Pa-s) | 3739 | 8052 | 4240 | 8332 | 3839 | 4842 | 3927 | 3441 |
| RR V0.1/V100 | 23 | 56 | 27 | 68 | 40 | 10.2 | 30 | 31 |
| Tan Delta@0.1 rad/s | 1.58 | 2.19 | 2.03 | 1.8 | 1.52 | 3.27 | 2.17 | 1.45 |
| Tan Delta@100 rad/s | 0.47 | 0.26 | 0.48 | 0.23 | 0.57 | 0.64 | 0.59 | 0.623 |
| Tan Delta ratio (R2/R1) | >=1 | | 1.08 | | 0.84 | 1 (single reactor unimodal polymer) | N/A | >=1 |
| Absolute Tan delta slope m | 11.1 | 19.3 | 15.5 | 15.8 | 9.5 | 26.3 | 15.8 | 8.3 |
| Overall (R2)Mw/V0.1 | 2.3 | | 2.2 | | 1.7 | 3.4 | 2.3 | 1.5 |
| Overall Mw/(1389.6*MV + 115000) | 0.9 | | 1.1 | | 1.1 | 0.8 | 1.3 | 0.8 |
| Overall Mw/(1389.6*MV + 140000) | 0.8 | | 1.0 | | 1.0 | 0.7 | 1.1 | 0.7 |
| V0.1/0.5464 [(Pa · s)(mole/g) Mz − 155,000 Pa · s] | 0.7 | | 0.5 | | 0.6 | 0.5 | 0.3 | 0.9 |
| V0.1/0.5464 [(Pa · s)(mole/g) Mz − 200,000 Pa · s], | 0.8 | | 0.5 | | 0.6 | 0.7 | 0.3 | 1.2 |

[#]CS3 is Inv. 1 Table 3, FIG. 3, WO2018/005922
[$]CS4 is Inv. 2 table 4, WO2018/005852
[%]CS5 is EPDM B47 Table 2. WO2014/003857
IE—inventive example IE1 contains 38.6% of the first polymer component (EPDM produced in reactor 1) and 61.40 wt % of the second polymer component (EPDM produced in reactor 2). Weight tan delta ratio is a result of the unique dual catalyst/dual reactor configuration. The first catalyst (catalyst A) in the first reactor produces high molecular weight (375,000 to 400,000) linear EPDM terpolymer and the second catalyst (catalyst B) in the second reactor produces branched EPDM terpolymer.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A composition comprising:
    a neat ethylene/propylene/nonconjugated polyene interpolymer comprising from greater than 0 wt % to 6.0 wt % nonconjugated polyene, the interpolymer having the following properties
    (i) a molecular weight (Mw) from 240,000 to 270,000;
    (ii) a Mooney viscosity (ML (1+4), 125° C.) from 80 to 85;
    (iii) a rheology ratio from 35 to 65;
    (iv) a Mw/Mn from 2.2 to 3.5;
    (v) a tan delta ratio from 0.6 to 0.9; and
    (vi) an absolute tan delta slope from 5.0 to less than 10.0.

2. The composition of claim 1 wherein the neat ethylene/propylene/nonconjucated polyene interpolymer has a Mw/V0.1 ratio less than 1.80 (g/mol).

3. The composition of claim 1 wherein the neat ethylene/propylene/nonconjugated polyene interpolymer is void of a $^{13}$C NMR peak from 34.4 ppm to 34.6 ppm.

4. The composition of claim 1 wherein the neat ethylene/propylene/nonconjugated polyene interpolymer comprises
    from 45 wt % to 55 wt % ethylene monomer;
    from 40 wt % to 50 wt % propylene comonomer; and
    from 3 wt % to 6 wt % 5-ethylidene-2-norbornene termonomer (ENB).

5. The composition of claim 4 wherein the neat ethylene/propylene/nonconjugated polyene interpolymer has the following properties
    (i) a molecular weight (Mw) from 240,000 to 260,000;
    (ii) a Mooney viscosity (ML (1+4, 125° C.) from 80 to 85;
    (iii) a rheology ratio from 35 to 45;
    (iv) a Mw/Mn from 3.0 to 3.5;
    (v) a tan delta ratio from 0.6 to 0.9;
    (vii) is void of a 13C NMR peak from 34.4 ppm to 34.6 ppm; and
    (viii) has a Mw/V0.1 ratio from 1.5 to 1.7.

6. The composition of claim 5 wherein the neat ethylene/propylene/nonconjugated polyene interpolymer has a Mw/Mn from 3.2 to 3.5.

7. The composition of claim 6 wherein the neat ethylene/propylene/nonconjugated polyene interpolymer has a tan delta ratio from 0.7 to 0.9.

8. The composition of claim 1 wherein the neat ethylene/propylene/nonconjugated polyene interpolymer comprises is an in-reactor blend of
    a first polymer component having a Mw from 375,000 to 400,000; and
    a second polymer component.

9. The composition of claim 8 wherein the neat ethylene/propylene/nonconjugated polyene interpolymer comprises
    from 30 wt % to 40 wt % of the first polymer component; and
    from 70 wt % to 60 wt % of the second polymer component.

10. The composition of claim 1 wherein the neat ethylene/propylene/nonconjugated polyene interpolymer comprises from 1 ppm to 5 ppm hafnium and from 1 ppm to 5 ppm zirconium.

* * * * *